(12) United States Patent
Stein et al.

(10) Patent No.: US 6,738,794 B2
(45) Date of Patent: May 18, 2004

(54) PARALLEL BIT CORRELATOR

(75) Inventors: Yosef Stein, Kfar Saba (IL); Haim Primo, Rmat Gan (IL)

(73) Assignee: Analog Devices, Inc., Norwood, MA (US)

(*) Notice: Subject to any disclaimer, the term of this patent is extended or adjusted under 35 U.S.C. 154(b) by 539 days.

(21) Appl. No.: 09/829,681

(22) Filed: Apr. 10, 2001

(65) Prior Publication Data

US 2002/0147825 A1 Oct. 10, 2002

(51) Int. Cl.[7] .............................................. G06F 17/15
(52) U.S. Cl. ........................................ 708/212; 708/422
(58) Field of Search ................................. 708/212, 422

(56) References Cited

U.S. PATENT DOCUMENTS

| 3,805,037 | A |   | 4/1974  | Ellison |        |
|-----------|---|---|---------|---------|--------|
| 4,722,050 | A |   | 1/1988  | Lee et al. | |
| 4,847,801 | A |   | 7/1989  | Tong |      |
| 4,852,098 | A |   | 7/1989  | Brechard et al. | |
| 4,918,638 | A |   | 4/1990  | Matsumoto et al. | |
| 5,073,864 | A | * | 12/1991 | Methvin et al. | 708/212 |
| 5,095,525 | A |   | 3/1992  | Almgren et al. | |
| 5,214,763 | A |   | 5/1993  | Blaner et al. | |
| 5,379,243 | A |   | 1/1995  | Greenberger et al. | |
| 5,383,142 | A | * | 1/1995  | Chung | 708/212 |
| 5,528,526 | A | * | 6/1996  | Klug et al. | 708/212 |
| 5,689,452 | A |   | 11/1997 | Cameron | |
| 5,894,427 | A | * | 4/1999  | Chung | 708/212 |
| 6,246,768 | B1 |  | 6/2001  | Kim | |
| 6,317,763 | B1 |  | 11/2001 | Vatinel | |
| 6,384,713 | B1 |  | 5/2002  | Yu | |
| 6,389,088 | B1 |  | 5/2002  | Blois et al. | |
| 6,434,662 | B1 |  | 8/2002  | Greene et al. | |
| 6,631,466 | B1 | * | 10/2003 | Chopra et al. | 712/300 |

* cited by examiner

Primary Examiner—David H. Malzahn
(74) Attorney, Agent, or Firm—Iandiorio & Teska

(57) ABSTRACT

A parallel bit correlator for recognizing a predetermined bit pattern including a predefined number m of bits in a stream of data bits including identifying successive sets of m bits in a stream of data bits and simultaneously comparing each of the sets of m bits to the predetermined bit pattern for detecting the presence of the predetermined bit pattern in the stream of data.

12 Claims, 5 Drawing Sheets

PARALLEL BIT CORRELATOR

FIELD OF THE INVENTION

This invention relates to a parallel bit correlator for communications and Internet applications and to such a correlator useful as an Internet protocol (IP) filter.

BACKGROUND OF THE INVENTION

In communications systems such as ADSL modems, GSM systems and Internet applications devices (IADs), a series of data segments are transmitted in a stream. This stream of data includes control segments such as synchronization segments which are used by receiving devices to identify the beginning of a message packet, or for Internet protocol applications, the data stream contains address segments that define to which Internet device a particular message packet is addressed.

In either case the stream of data must be examined to see if it contains control segments, e.g., synchronization segments or address segments. These control segments may contain simply a few bits or may include a number of words each including a plurality of bits. Presently this examination is done serially. For example, if the control segments being searched for include four bits in a data stream of n bits, the system must first examine bits 1–4 to see if they match the sought four bit control segments. Then it examines bits 2–5, then 3–7 and continue examining four bit sets shifted by one bit until the n-3$^{th}$ through nth bit is examined or until a pattern match is found. This method is time consuming and processor-intensive, often requiring many instructions and iterations to find a pattern match.

BRIEF SUMMARY OF THE INVENTION

It is therefore an object of this invention to provide an improved parallel bit correlator.

It is a further object of this invention to provide such an improved parallel bit correlator which is faster and requires fewer iterations and instructions to find a pattern match.

It is a further object of this invention to provide such an improved parallel correlator which can function as an Internet protocol filter.

The invention results from the realization that a faster, more effective correlator for recognizing a predetermined bit pattern having a predefined numbers of m bits such as a synchronizing data segment or address data segment in a stream of data segments can be achieved with a parallel bit correlator that identifies successional sets of m bits in a data stream and simultaneously compares them to the predetermined bit pattern to determine whether that bit pattern (control segment) is present in the data stream.

This invention features a parallel bit correlator for recognizing a predetermined bit pattern including a predefined number m of bits in the stream of data bits including an array of logic cells and a bit match enabling circuit for enabling a number of sets of m logic cells corresponding to successive sets of m bits in a stream of data bits. A bit mask loading circuit holds a bit of the predetermined bit pattern for each logic cell and a detection circuit simultaneously compares each of the sets of m bits with the predetermined bit pattern.

In a preferred embodiment the array of logic cells may be arranged in rows and columns and the sets of m logic cells may be disposed in successive rows and columns. Each logic cell may include an AND gate each set of m logic cells may include a NOR gate responsive to the AND gate of each of the associated logic cells the enabling circuit may include a first bi-stable device for enabling the AND gate the means for storing may include a second bi-stable device for holding the value of the bit pattern and the means for detecting may include an X-OR gate responsive to the second bi-stable device and to a bit from the m bits in a stream of data bits.

This invention also features a programmable logic device using a parallel bit correlator for recognizing a predetermined bit pattern including a predefined number m of bits in a stream of data bits. There are means for identifying successive sets of m bits in a stream of data bits and means for simultaneously comparing each of the sets of m bits to the predetermined bit pattern for detecting the presence of a predetermined bit pattern in the stream of data.

In a preferred embodiment the means for identifying may include an array of logic cells and an enabling circuit for enabling a number of sets of m logic cells corresponding to the successive sets of m bits. The means for simultaneously comparing may include means for storing the predetermined bit pattern and means for detecting a match between the predetermined bit pattern and the sets of m bits. The array of logic cells may be arranged in rows and columns and the sets of m logic cells may be disposed in successive rows and columns. Each logic cell may include an AND gate, each set of m logic cells may include a NOR gate responsive to the AND gate of each of the associated logic cells the enabling circuit may include a first bi-stable device for enabling the AND gate. The means for storing may include a second bi-stable device for holding the value of a bit of the bit pattern. The means for detecting may include an X-OR gate responsive to the second bi-stable device and to a bit from the m bits in a stream of data bits.

BRIEF DESCRIPTION OF THE DRAWINGS

Other objects, features and advantages will occur to those skilled in the art from the following description of a preferred embodiment and the accompanying drawings, in which.

This invention may be accomplished with a parallel bit correlator for recognizing a predetermined bit pattern including a predefined number m of bits in a stream of data bits. There are some means for identifying successive sets of m bits in a stream of data bits and means for simultaneously comparing each of those sets of m bits to a predetermined bit pattern for detecting the presence of that predetermined bit pattern in the stream of data.

Figure 1:
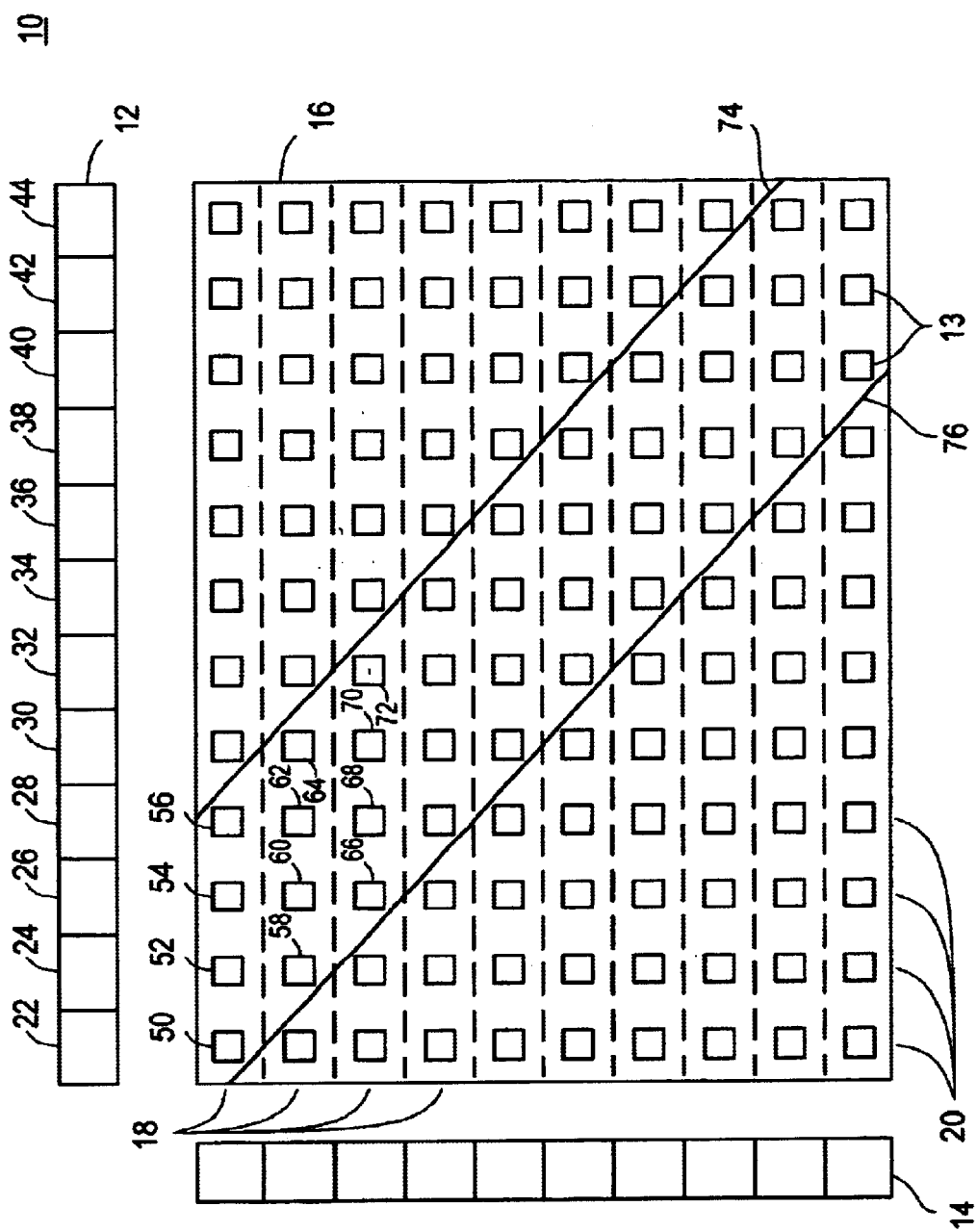
FIG. 1 is a diagram of a parallel bit correlator according to the invention.

There is shown in FIG. 1 a parallel bit correlator 10 according to this invention including an input register 12 and output register 14 serving an array of logic cells 16 arranged conveniently but not necessarily in rows 18 and columns 20. A data stream is received in input register 12 where for example each block 22, 24, 26 . . . represents a bit or a group of bits such as a word referred to generally herein as a data segment. Rows and columns 18 and 20 are made up of logic circuits each of which includes a logic cell and an associated comparator bit mask enabling circuit and bit mask loading circuit as will be explained hereinafter.

Assuming for the sake of example that the predetermined bit pattern that is sought contains but four bits or four data segments, the data stream of the input register will be attributed as follows. Each of the data segments 22 through 44, then the first set of m data segments of bits will include bits or data segments 22, 24, 26, and 28, the second set of m bits will include bits 24, 26, 28, and 30, the next m bits will include 26, 28, 30, and 32 and so on. In order to examine each one of these sets of m bits present in register 12 the array 16 contains a plurality of logic circuits each of which contains a logic cell, a comparator circuit, a bit mask enable circuit and a pattern bit loading circuit. These logic circuits are grouped so that they correspond to a single set of m data segments 22 through 44 in input register 12. Thus logic circuits 50, 52, 54 and 56 correspond to the first set of m data segments 22 through 28. Logic circuits 58, 60, 62 and 64 correspond to the next set of m data segments 24 through 30. Logic circuits 66, 68, 70 and 72 correspond to the next set of m data segments 26 through 32 and so on. Thus, when the data stream is resident in input register 12, whether stored there or momentarily as it streams through, all of the logic circuits between the phantom lines 74 and 76 can be simultaneously enabled so that all of the successive sets of m data segments in input register 12 are simultaneously compared with a predetermined bit pattern to detect whether the bit pattern is present and where it is present in the data stream in input register 12. A match will provide an output to output register 14 that identifies the data segment and the position in register 14 where it resides. It should be understood that while this illustrative example uses only four bits, any number of bits 11, 16, 35, 64 . . . can be used. Further, using this invention, all of the logic circuits outside of lines 74, 76 can be eliminated, saving both space and power in the integrated circuit.

Figure 2:
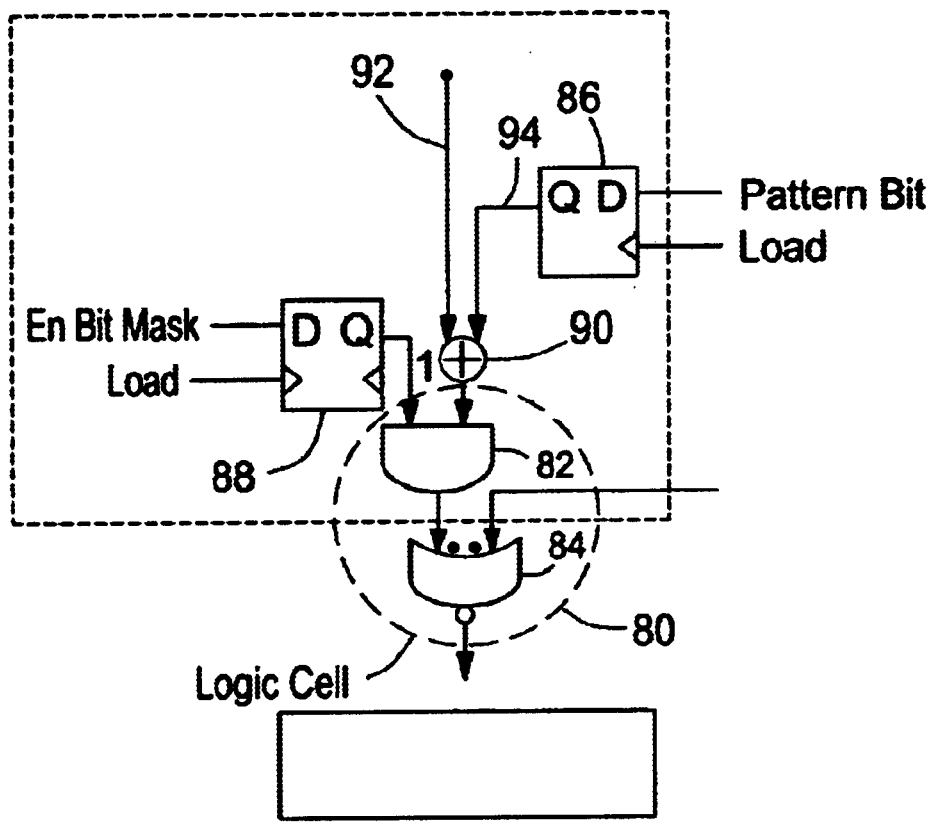
FIG. 2 is a logical representation of one programmable cell of the array according to the present invention.

Each logic circuit as explained with respect to logic circuit 50, FIG. 2, includes a logic cell 80 including AND gate 82 and a NOR gate 84. The pattern bit loading circuit 86 is also included, implemented for example with a flip-flop, and a bit mask enable circuit 88 is also included, implemented for example with a flip-flop. Finally, there is a comparator circuit, for example, exclusive OR gate 90.

In operation, exclusive OR gate 90 receives at one input 92 a data bit from one of the data bit or data segments 22 through 44. At its other input 94 exclusive OR gate 90 receives the output from pattern bit circuit 86. This circuit holds or stores either a 1 or a 0 or if a data segment instead of a single bit is used, a plurality of bits such as a word might be stored. If the input from the data segment in the input register 12 matches that stored in the pattern bit circuit 86, exclusive OR gate 90 produces a favorable comparison and provides an output to AND gate 82. If not, its output indicates that there has not been a match. This match can only be acted upon if this particular circuit 50 is enabled. That is if it is one of the logic circuits between the lines 76 and 74 in FIG. 1. Thus, if bit mask enabling circuit 88 provides a suitable signal, for example a 1 to AND gate 82, it is enabled. Thus this logic circuit 50 is one of the circuits to be used between the lines 76 and 74 in FIG. 1. Bit mask enabling circuit 88 will provide a suitable signal for example a 1 to AND gate 82 enabling it to pass through the comparison or non-comparison signal, the match or no-match signal from exclusive OR gate 90. The output of this AND gate 82 indicates whether or not there is a match for this 1 of the m bits NOR gate 84 combines the outputs from all m of the logic circuits associated with a particular set of m inputs to provide an output that indicates whether or not there has been a match with the entire predetermined bit pattern.

Figure 3:
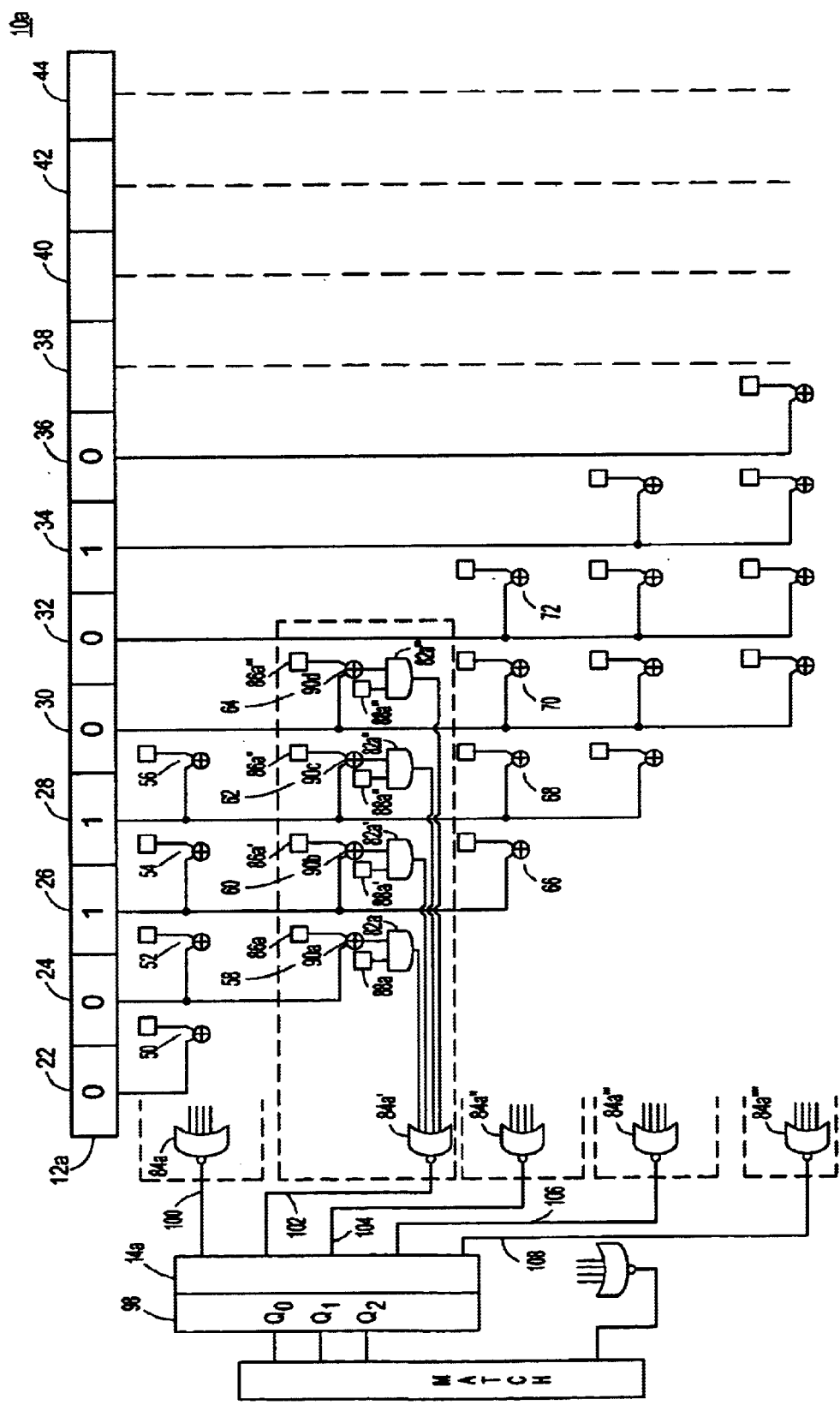
FIG. 3 is a more detailed diagram of a portion of the array of programmable cells of a parallel bit correlator according to the present invention.
Figure 4:
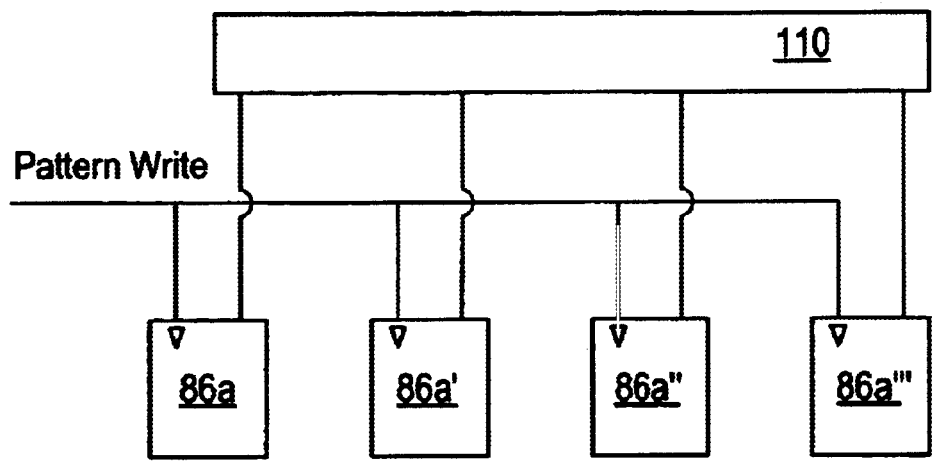
FIG. 4 is a detail diagram of a bit pattern loading circuit of FIG. 3.
Figure 5:
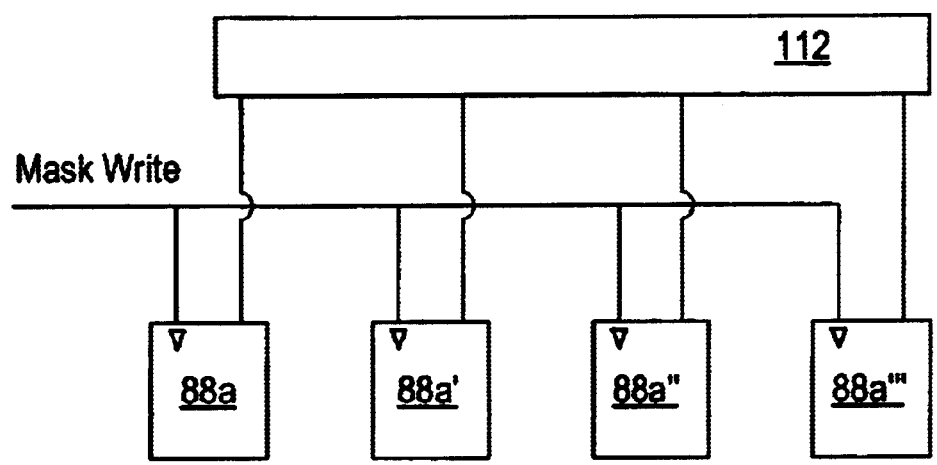
FIG. 5 is a detail diagram of the bit mask enabling circuit of FIG. 3.

Although thus far the description has shown a distributive implementation, that is every logic circuit has its own pattern bit loading circuit 86 and bit mask enabling circuit 88, this is not a necessary limitation of this invention as these functions could be performed by a single centralized circuit that controls each of the logic circuits. A more detailed implementation of the array 16 of FIG. 1 as implemented with the logic circuits as illustrated in more detail with respect to logic circuit 50, FIG. 2 is shown in FIG. 3 where the four logic circuits 58, 60, 62 and 64 have been shown in more detail as to their interaction in connection with the common NOR gate 84a'. Similar connections are made with respect to logic circuits 50, 52, 54 and 56, and 66, 68, 70 and 72 as well as the remaining unnumbered ones. Output register 14a, FIG. 3 is shown including a binary encoder so that each of the outputs 100, 102, 104, 106, and 108 from their respective NOR gates 84a, 84a', 84a", 84a''', 84a'''' is recognized as to its position. Whichever one of those outputs 100–108 indicates a match will then be recognized on the output so that the location as well as the presence of the sought after predetermined bit pattern can be displayed. The particular logic circuits shown in FIG. 1 to be enabled are not relegated only to those shown in that embodiment. For whatever reason it may be desirable to program different ones at different times. For this purpose the pattern bit load circuits 86a, 86a', 86a", 86a''', FIG. 4, include read-write memory 110 so that different sets of logic circuits can be enabled as desired. Similarly, as shown in FIG. 5, microprocessor or similar device 112 may be used to drive bit mask enable circuits 88a, 88a', 88a", 88a''', so that the particular predetermined bit pattern being sought can be redefined as desired with the enable cells can be redefined as desired.

Figure 6:
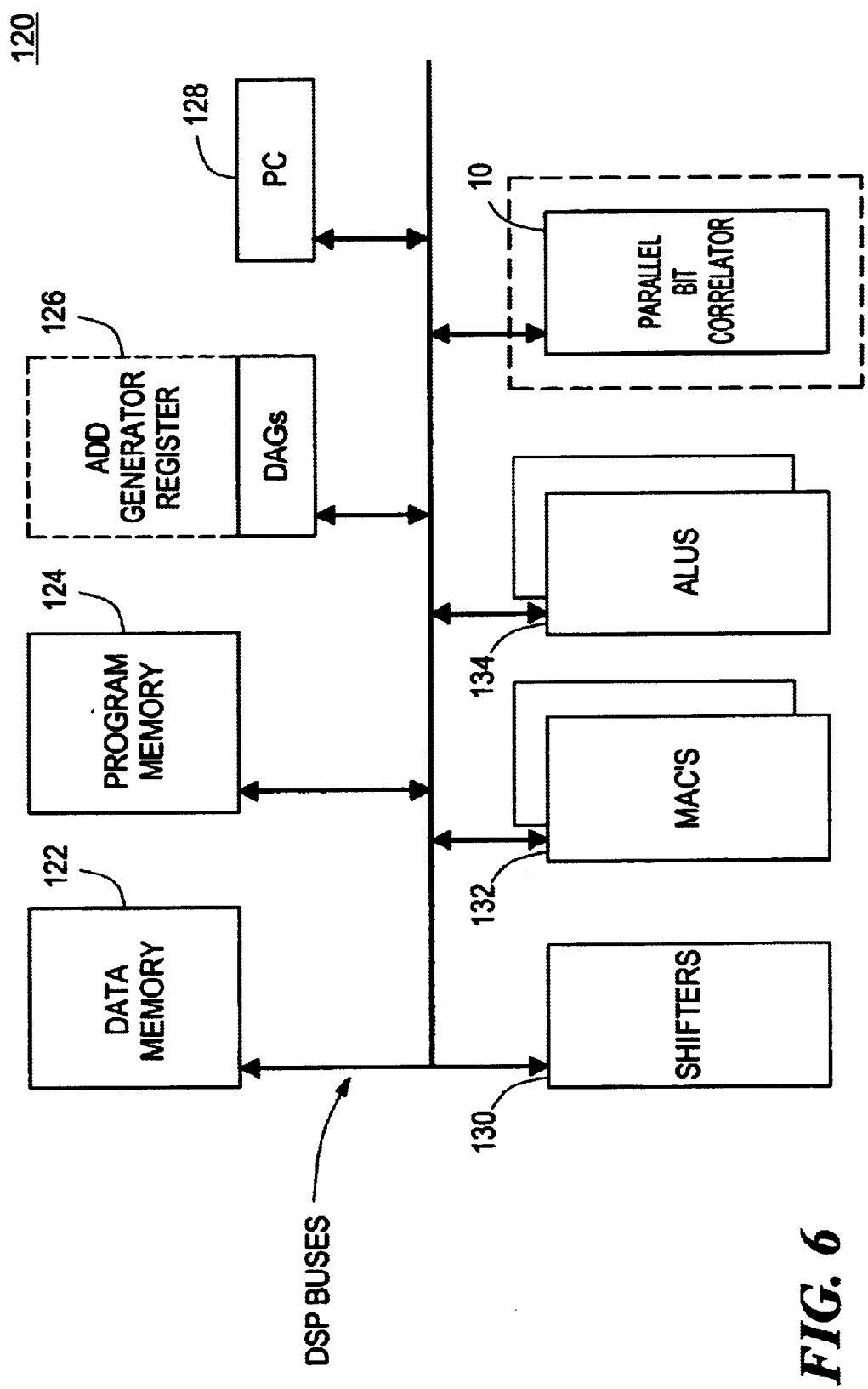
FIG. 6 is a schematic block diagram of a programmable logic device, e.g., digital signal processor (DSP) which uses the parallel bit correlator of this invention.

One application of the parallel bit correlator 10 of this invention is in a DSP 120, FIG. 6, which includes, for example, data memory 122, program memory 124. Data address generator (DAG) register 126, PC 128, shifters 130, multiplying accumulating units 132 and ALU's 134. In a preferred construction, a parallel bit correlator is implemented as a functional unit within a programmable logic device such as a digital signal processor (DSP) or general purpose microprocessor. This functional unit is preferably operated by way of a special instruction which presents the appropriate operands to the parallel bit correlator, outputting the results thereof in a chip register file in a form in which the programmable logic device is itself. It is further contemplated that the parallel bit correlator unit according to the present invention may alternatively be implemented by way of a custom logic circuit, either as a standalone realization of such a unit or as a co-processor or dedicated subsystem.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims:

What is claimed is:

1. A parallel bit correlator for recognizing a predetermined bit pattern including a predefined number m of bits in a stream of data bits comprising:

an array of logic cells;

a bit mask enabling circuit for enabling a number of sets of m logic cells corresponding to successive sets of m bits in a stream of data bits;

a pattern bit loading circuit for each logic cell holding a bit of the predetermined bit pattern; and a detection circuit for simultaneously comparing each of said sets of m bits with the predetermined bit pattern.

2. The parallel bit correlator of claim 1 in which said array of logic cells is arranged in rows and columns and said sets of m logic cells are disposed in successive rows and columns.

3. The parallel bit correlator of claim 2 in which each logic cell concludes an AND gate.

4. The parallel bit correlator of claim 3 in which each set of m logic cells includes a NOR gate responsive to the AND gate of each of the associated logic cells.

5. The parallel bit correlator of claim 4 in which said enabling circuit includes a first bistable device for enabling said AND gate.

6. The parallel bit correlator of claim 5 in which said means for storing includes a second bistable device for holding the value of a bit of sent bit pattern.

7. A programmable logic device including a parallel bit correlator comprising:

an array of logic cells;

a bit mask enabling circuit for enabling a number of sets of m logic cells corresponding to successive sets of m bits in a stream of data bits;

a pattern bit loading circuit for each logic cell holding a bit of the predetermined bit pattern; and a detection circuit for simultaneously comparing each of said sets of m bits with the predetermined bit pattern.

8. The programmable logic device of claim 7 in which said array of logic cells is arranged in rows and columns and said sets of m logic cells are disposed in successive rows and columns.

9. The programmable logic device of claim 8 in which each logic cell concludes an AND gate.

10. The programmable logic device of claim 9 in which each set of m logic cells includes a NOR gate responsive to the AND gate of each of the associated logic cells.

11. The programmable logic device of claim 10 in which said enabling circuit includes a first bistable device for enabling said AND gate.

12. The programmable logic device of claim 11 in which said means for storing includes a second bistable device for holding the value of a bit of sent bit pattern.

* * * * *